US008981728B1

(12) United States Patent
Copelli et al.

(10) Patent No.: US 8,981,728 B1
(45) Date of Patent: Mar. 17, 2015

(54) WIRELESS POWER TRANSFER VIA DATA SIGNAL

(71) Applicant: Shangri-la Management S.L., Reus (ES)

(72) Inventors: Pablo Ricardo Copelli, Barcelona (ES); Joan Torrents Casanovas, Barcelona (ES); Marc Freixas Coronas, Barcelona (ES)

(73) Assignee: Shangri-la Management S.L., Reus (ES)

( * ) Notice: Subject to any disclaimer, the term of this patent is extended or adjusted under 35 U.S.C. 154(b) by 0 days.

(21) Appl. No.: 14/272,040

(22) Filed: May 7, 2014

Related U.S. Application Data

(63) Continuation of application No. 14/269,780, filed on May 5, 2014.

(51) Int. Cl.
*H02J 7/00* (2006.01)
*H02J 7/02* (2006.01)

(52) U.S. Cl.
CPC ......... *H02J 7/025* (2013.01); *H02J 2007/0096* (2013.01)
USPC ........................................................ 320/137

(58) Field of Classification Search
CPC .......... H04B 1/405; H04B 1/406; H04B 1/40; H04B 1/005; H03D 7/163; H02J 7/025; H01F 38/14; Y02T 90/122; B60L 11/182; Y02E 60/12

USPC .......................................................... 320/137
See application file for complete search history.

(56) References Cited

U.S. PATENT DOCUMENTS

| | | | |
|---|---|---|---|
| 6,249,690 B1 * | 6/2001 | Mashiko ........................ 455/573 |
| 8,102,147 B2 * | 1/2012 | Jung .............................. 320/108 |
| 2006/0181245 A1 * | 8/2006 | Mizuno et al. ................. 320/132 |
| 2007/0072014 A1 * | 3/2007 | Kim et al. ........................... 429/7 |
| 2007/0182367 A1 * | 8/2007 | Partovi ........................... 320/108 |
| 2008/0211455 A1 * | 9/2008 | Park et al. ...................... 320/108 |
| 2012/0313579 A1 * | 12/2012 | Matsumoto et al. ........... 320/108 |
| 2013/0149578 A1 * | 6/2013 | Uchida ............................ 429/90 |

* cited by examiner

*Primary Examiner* — Arun Williams
(74) *Attorney, Agent, or Firm* — Fenwick & West LLP (57) ABSTRACT

A system for wireless power transfer via a data signal including a transmitter configured to generate and transmit a wireless data signal that includes charging data to a receiver. The receiver includes a receiver memory bank including memory storage devices coupled to memory buses. The receiver includes a decoder configured to decode the wireless data signal received by the receiver to extract charging data therefrom, and write the charging data to the memory storage devices. The receiver includes a charge controller configured to cause the memory storage devices to output portions of the charging data on the memory busses. The receiver includes a voltage conversion circuit coupled to the memory busses configured to produce partial charging signals from the portions of charging data received on the memory busses. The receiver includes a voltage aggregator configured to aggregate the partial charging signals to generate a charging signal.

20 Claims, 5 Drawing Sheets

WIRELESS POWER TRANSFER VIA DATA SIGNAL

CROSS REFERENCE TO RELATED APPLICATIONS

This application is a continuation of U.S. application Ser. No. 14/269,780, filed on May 5, 2014, which is incorporated by reference in its entirety.

BACKGROUND

1. Field of Disclosure

This disclosure relates to the field of wireless power transfer, and specifically to wireless power transfer via a data signal.

2. Description of the Related Art

There is an increasing trend for electronic devices to be cordless and portable. Conventional charging for these types of devices is done by either plugging the device into a power outlet, or via wireless charging. Conventional wireless charging techniques are based on induction, magnetic resonance, microwave, or laser. However, these wireless charging techniques fall short in range and/or power.

SUMMARY

The above and other needs are met by a receiver, a transmitter, and a system for wireless power transfer via a data signal.

One embodiment of a receiver for wireless power transfer via a data signal, comprises a receiver memory bank including a plurality of memory storage devices coupled to a plurality of memory buses. The receiver also includes a decoder configured to: decode a wireless data signal received by the receiver to extract charging data therefrom, and write the charging data to the plurality of memory storage devices. The receiver also includes a charge controller configured to cause the plurality of memory storage devices to output portions of the charging data on the plurality of memory busses. The receiver also includes a voltage conversion circuit coupled to the plurality of memory busses configured to produce partial charging signals from the portions of charging data received on the plurality of memory busses. The receiver also includes a voltage aggregator configured to aggregate the partial charging signals to generate a charging signal.

One embodiment of a transmitter for wireless power transfer via a data signal, comprises a transmitter memory bank that includes a plurality of memory storage devices that store charging data and are scaled relative to a plurality of memory storage devices in a corresponding receiver. The transmitter also includes an encoder configured to generate an information signal using portions of the charging data in the transmitter memory bank. The transmitter also includes a signal generator configured to generate a carrier signal. The transmitter also includes a modulator configured to modulate the carrier signal with the information signal to generate the data signal. The transmitter also includes an antenna coupled to the modulator that wirelessly transmits the data signal to the corresponding receiver, the receiver adapted to store charging data derived from the data signal in the plurality of memory storage devices in the receiver.

One embodiment of a system for wireless power transfer via a data signal, comprises a transmitter configured to generate and transmit a wireless data signal that includes charging data, and a receiver configured to receive the wireless data signal. The receiver includes a receiver memory bank including a plurality of memory storage devices coupled to a plurality of memory buses. The receiver also includes a decoder configured to: decode the wireless data signal received from the receiver to extract charging data therefrom, and write the charging data to the plurality of memory storage devices. The receiver also includes a charge controller configured to cause the plurality of memory storage devices to output portions of the charging data on the plurality of memory busses. The receiver also includes a voltage conversion circuit coupled to the plurality of memory busses configured to produce partial charging signals from the portions of charging data received on the plurality of memory busses. The receiver also includes a voltage aggregator configured to aggregate the partial charging signals to generate a charging signal.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
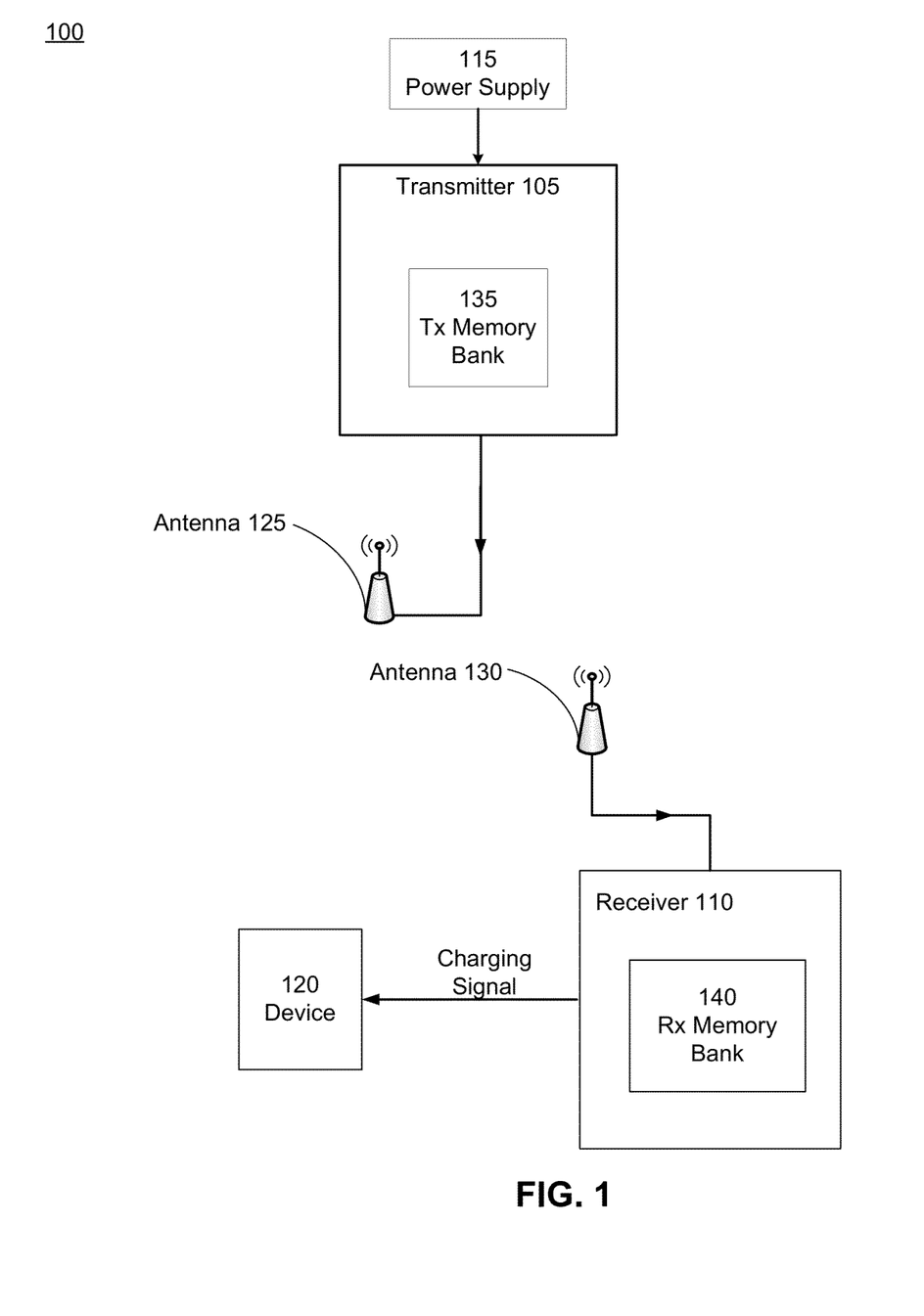
FIG. 1 is a high-level block diagram illustrating an embodiment of a system for wireless power transfer via a data signal.

FIG. 1 is a high-level block diagram illustrating an embodiment of a system 100 for wireless power transfer via a data signal. The system includes a transmitter 105, a receiver 110, a power supply 115, and a device 120. Here only one transmitter 105, receiver 110, and device 120 are illustrated, but there may be multiple instances of each of these entities. For example, there may be multiple devices 120 each being charged by one or more receivers 110.

The transmitter 105 is a wireless transmitter that generates a data signal used for wireless power transfer (via the receiver 110) to the device 120. The data signal is a carrier signal that has been modulated with an information signal that is specific to the receiver 110. The transmitter 105 includes a transmitter (Tx) memory bank 135. As described in detail below with respect to FIG. 2, the Tx memory bank 135 includes one or more memory storage devices (e.g., dynamic random access memory (DRAM)) that store charging data. Charging data is a specific configuration of bit values (i.e., 1s and 0s) that are addressable to memory locations in the receiver 110.

The transmitter 105 generates the information signal using the charging data stored in the Tx memory bank 135. The transmitter 105 reads the charging data from the Tx memory bank 135. Additionally, in some embodiments, the transmitter 105 may also read portions of the charging data from a virtual memory associated with the Tx memory bank 135. Additionally, in some embodiments, the transmitter 105 may upsample portions of the charging data, such that a single bit value may result in multiple bits of charging data. The transmitter 105 generates an index that is associated with the charging data. The index maps portions of the charging data to specific memory storage devices in the receiver 110. The transmitter 105 generates the information signal by appending the charging data to the index.

Additionally, as discussed below with reference to FIG. 2, in some embodiments the transmitter 105 may encode portions of the information signal (e.g., the index and the charging data) using a key. The transmitter 105 may include the key within the information signal. Additionally, the transmitter 105 may encode the data using forward error correction (FEC), bipolar encoding, some other encoding technique that allows error correction without needing a reverse channel, or some combination thereof, to facilitate error free decoding of the information signal at the receiver 110. Thus, the information signal may include encoded data, non-encoded data, or some combination thereof.

The transmitter 105 modulates a carrier signal with the information signal to generate a data signal for wireless power transfer. The transmitter 105 transmits the data signal to the receiver 110 via an antenna 125.

The receiver 110 receives the data signal using an antenna 130. The receiver 110 demodulates the data signal to extract the index and charging data from the information signal. In some embodiments, the receiver 110 decodes the encoded information signal using a key in the information signal. Additionally, the receiver 110 may perform error correction, such as FEC, on the decoded information signal.

The receiver 110 writes the charging data to a Rx memory bank 140 included in the receiver 110 in accordance with the index. For example, if the Rx memory bank 140 includes two memory storage devices, memory storage device A and memory storage device B, the index would specify which portion of the charging data is to be written to memory storage device A and which portion of the charging data is to be written to memory storage device B. Additionally, in some embodiments, portions of the charging data may be written to one or more virtual memories associated with each memory storage device. As discussed below, partial charging signals may be extracted from the charging data values written to the memory storage devices, aggregated, and used to charge the device 120 and/or power components of the receiver 110.

The Rx memory bank 140 includes one or more memory storage devices that store charging data. Each memory storage device includes physical memory cells that have addressable physical memory locations. A physical memory cell stores a single bit of information. For example, if the memory cell is part of a DRAM memory storage device, then the physical memory cell is generally composed of a capacitor to hold charge and a transistor to read the capacitor or change its state. The bit of information is represented by a voltage value associated with the physical memory cell.

The structure of the Rx memory bank 140 is such that its physical memory cells map to the physical memory cells in the Tx memory bank 135. In some embodiments, there is a 1 to 1 mapping between the memory storage devices (and associated physical memory cells) in the Rx memory bank 140 and the Tx memory bank 135. In other embodiments, the Rx memory bank 140 is a scaled up (e.g., by a factor of 4) version of the Tx memory bank 135. Additionally, in some embodiments, where the charging data was generated using virtual memory, each Rx memory bank 140 may additionally include a memory buffer that is a scaled version of the virtual memory.

The receiver 110 extracts portions of the stored charging data from each of the memory storage devices in the Rx memory bank 140. In alternate embodiments, a portion refers to all of the charging data in a memory storage device. The receiver 110 causes the Rx memory bank 140 to output (e.g., via read commands) portions of the stored charging data on a memory bus. The receiver 110 converts the portions of charging data to one or more partial charging signals.

The receiver 110 aggregates the partial charging signals from energy storage devices to produce a charging signal. For example, if there are four partial charging signals of 1.5 Volts each, the charging signal would be approximately 6 Volts. The receiver 110 charges the device 120 with the charging signal. As described in detail below with reference to FIG. 3, the charging signal may be provided to the device 120 in a variety of ways (e.g., directly, via induction, etc.).

The device 120 is a computing device that can operate using battery power. A device 120 might be, for example, a personal computer, a tablet computer, a smart phone, a laptop computer, or other type device that receives power from a battery. The device 120 uses the charging signal to charge a battery which powers the device 120.

The device 120 is thus charged via a charging signal that is generated from bit values stored in the Rx memory bank 140. Moreover, the data signal that determines the bit values is wirelessly transmitted to the receiver 110 from the transmitter 105. Thus allowing remote wireless charging of devices 120.

Figure 2:
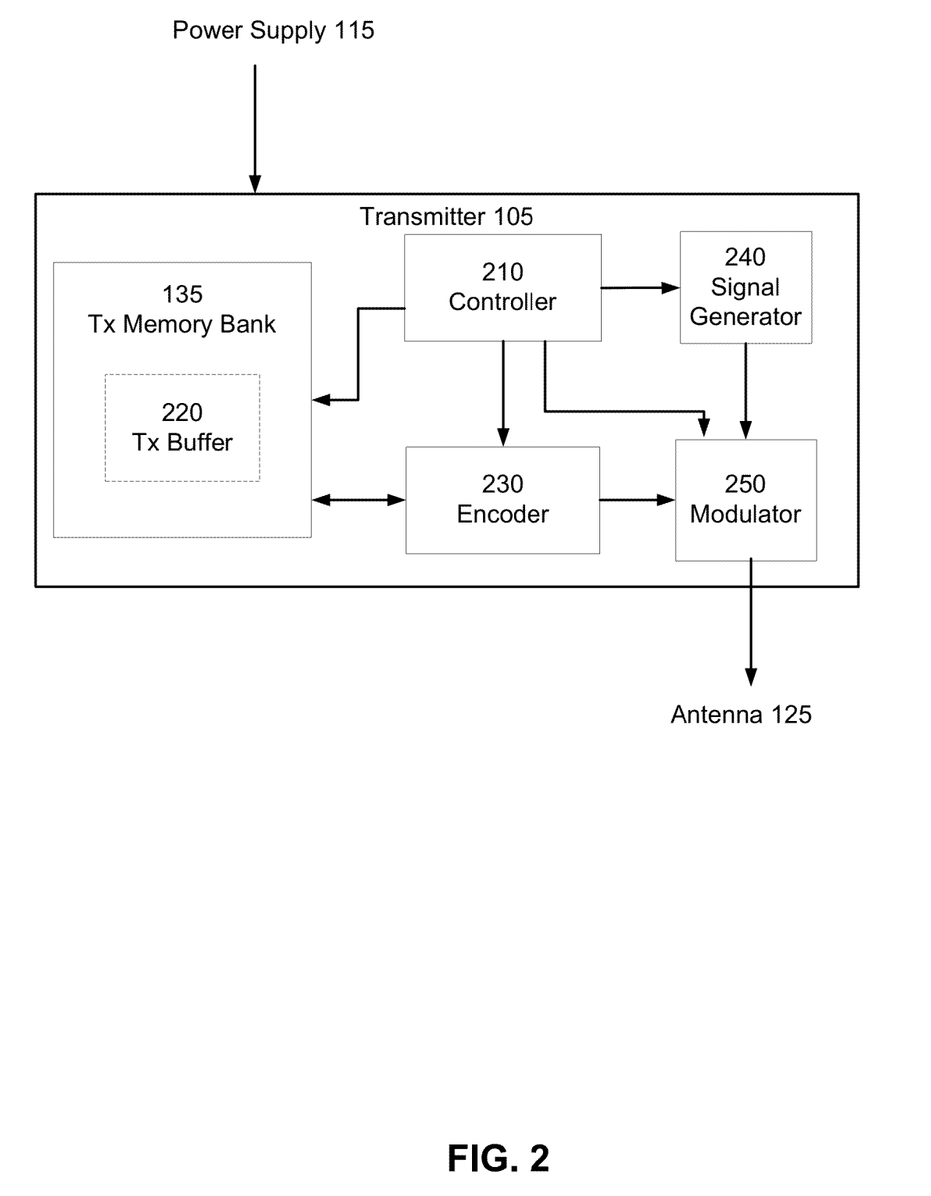
FIG. 2 is a block diagram illustrating a detailed view of the components within a transmitter according to an embodiment.

Turning now to a detailed explanation of the transmitter, FIG. 2 is a block diagram illustrating a detailed view of the components within the transmitter 105 according to an embodiment. The transmitter 105 includes a controller 210, a Tx memory bank 135, an encoder 230, a signal generator 240, and a modulator 250. The transmitter 105 is powered by the power supply 115 (e.g., a battery, power from a wall outlet, etc.).

The controller 210 controls the other components within the transmitter 105. The controller provides instructions to the components of the transmitter 105 that cause the transmitter 105 to generate and transmit a wireless data signal. Additionally, the controller 210 may provide one or more control parameters to components of the transmitter 105 that control how the data signal is generated and/or transmitted. A control parameter may be, for example, charging data, an encoding key, a carrier frequency, a modulation scheme, some other condition that affects how the data signal is generated, or some combination thereof. The controller 210 may retrieve control parameters from a look up table or other stored data that maps various receivers 110 to one or more control parameters. Thus, a controller 210 may retrieve control parameters from the lookup table based on the intended receiver 110, and provide the control parameters to components of the transmitter 105 such that a data signal specific to the receiver 110 is transmitted. The controller 210 may be coupled to the Tx memory bank 135, the encoder 230, the signal generator 240, and the modulator 250.

The controller 210 determines the charging data using the lookup table or other stored data. In some embodiments, the charging data is such that the physical memory cells in the receiver 110 all have the highest voltage level (e.g., a bit value of 1), however, a long series of 1s in the data stream may cause problems with error checking, accordingly, the controller 210 may introduce a percentage of 0s to the charging data. For example, the controller 210 may be configured to set a percentage (e.g., 97%) of the charging data to a bit value of 1, and the remaining percentage (e.g., 3%) to a bit value of 0. The controller 210 writes the charging data to the Tx memory bank 135 (and in some embodiments a Tx buffer 220 described below).

As discussed above with respect to FIG. 1, the Tx memory bank 135 includes one or more memory storage devices. The Tx memory bank 135 stores portions of charging data to be written to a corresponding memory bank (e.g., Rx memory bank 140) in the receiver 110. The Tx memory bank stores 135 the portions of charging data as bit information that is written to physical memory cells. The bit of information is represented by a voltage value associated with the physical memory cell. The voltage value is either representative of a high state (i.e., a bit value of 1) or a low state (i.e., a bit value of 0). Depending on the type of memory, the exact voltage value representative of a high or low state may vary, however, the high state is generally set to be a larger voltage value than the low state. For example, in a 30 PIN-144 SO-DIMM memory storage device, a physical memory cell a high state is indicated using a voltage value of 70 nV and the low state is indicated using a voltage value of 50 nV. Additionally, the Tx memory bank 135 may include a Tx buffer 220. The Tx memory bank 135 may be coupled to the controller 210, the Tx buffer 220, and the encoder 230.

The Tx buffer 220 is a buffer (e.g., data store) that acts as a virtual memory for the Tx memory bank 135. The Tx buffer 220 stores portions of charging data to be written to a corresponding buffer in the receiver 110. As discussed in detail below with respect to FIG. 3, the corresponding buffer may write charging data stored in the buffer to physical memory cells in a memory storage device. In some embodiments, the Tx buffer 220 is composed of a plurality buffers, where each buffer is associated with a particular memory storage device in the Tx memory bank 135, and each buffer is composed of a plurality of virtual memory cells. A virtual memory cell has a virtual memory location, and is associated with a corresponding physical memory cell. A memory cell pair refers to a physical memory cell and its corresponding virtual memory cell. In general, values for a particular memory cell pair are the same. So, e.g., if a physical memory cell has a bit value of 1, its corresponding virtual memory cell would also have a bit value of 1. In alternate embodiments, the Tx buffer 220 is not present, and the controller 210 may instead create charging data to be assigned to buffers in the receiver 110.

The encoder 230 generates an information signal using charging data read from the Tx memory bank 135 and the Tx memory buffer 220. The encoder 230 receives instructions from the controller 210 to encode charging data. For each memory storage device storing some charging data, the encoder 230 assembles a portion of the charging data by reading a group of bit values (e.g., 16 bits) from the physical memory cells and the virtual memory cells associated with the memory storage device. The encoder 230 maps the portion of the charging data to an index value. The index value maps the bit values in the portion of charging data to a specific memory storage device (and/or associated buffer) in the Rx memory bank 140. The encoder 230 generates the charging data using the assembled portions of charging data. The encoder 230 generates the index using the index values associated with each of the joined portions of charging data. The encoder 230 generates the information signal by joining the index to the charging data.

In some embodiments, the encoder 230 upsamples the portions of the charging data read from the memory storage devices. The encoder 230 upsamples the charging data if, for example, the number of memory cell pairs associated with the Rx memory bank 140 is larger than the number of memory cell pairs associated with the Tx memory bank 130 used to generate the charging data. Thus, upsampling allows relatively small memory storage devices to be used in the Tx memory bank 130 while maintaining the ability to map charging data to larger memory storage devices in the receiver 110.

The encoder 230 encodes portions of the information signal. The encoder 230 encodes the charging data and associated index using a key to create encoded data. The key is a series of bits which may be used to encode and/or decode data (e.g., charging data, index, key, etc.). The key may be, for example, symmetric or asymmetric. In some embodiments, the encoder 230 combines the encoded portion of the information signal with some non-encoded data (e.g., a key for decoding). Additionally, in some embodiments the encoder 230 also adds an initialization packet that marks the beginning of the information signal. In some embodiments, the encoder 230 may apply error correction code to the information signal, such as forward error correction (FEC) and/or bipolar coding. In alternate embodiments, the encoder 230 encodes the key before it is added to the information signal. The encoder 230 may be coupled to the signal generator 240, the controller 210, and the Tx memory bank 135. The encoder 230 provides the information signal to the modulator 250.

The signal generator 240 generates a carrier signal. In some embodiments, the signal generator 240 is configured to generate a carrier signal at a particular frequency. For example, the signal generator 240 may generate a carrier signal in the kilohertz, megahertz, or gigahertz range (e.g., 3.2 GHz). The signal generator 240 is coupled to the modulator 250 and the controller 210. The signal generator 240 generates the carrier signal based in part on instructions. In some embodiments, the signal generator 240 may generate the carrier signal based in part on a control parameter (e.g., specifying a carrier frequency) received from the controller 210. The signal generator 240 provides the generated carrier signal to the modulator 250.

The modulator 250 modulates the carrier signal with the information signal to create the data signal. The modulator 250 is configured to modulate the carrier signal received from the signal generator 240 with the information signal received from the encoder 230. The modulator 125 may modulate the information signal using modulations schemes like, for example, quadrature amplitude modulation, amplitude shift keying, frequency shift keying, multiple phase shift keying, amplitude phase shift keying, orthogonal frequency division multiplexing, or some other digital modulation scheme. Additionally, in some embodiments, the modulator 250 may choose a modulation scheme based on a control parameter received from the controller 210. The modulator 250 may be coupled to the signal generator 240, the controller 210, the encoder 230, and the antenna 125. The modulator 250 provides the modulated signal to the antenna 125 for transmission.

Additionally, in some embodiments, the transmitter 105 continually generates and transmits data signals. In some embodiments, each data signal may include the entire charging data. In alternate embodiments, each data signal includes some portion of the charging data. For example, the first data signal may include a first portion of the charging data from each of the memory storage devices, a second data signal may include a second portion of the charging data from each of the memory storage devices, and so on. Once all the charging data has been transmitted, the process repeats in a cyclic manner until a stop condition is met. A stop condition is a condition that when satisfied causes the transmitter 105 to stop transmitting data signals. A stop condition may be, for example, turning off/de-powering the transmitter 105, meeting some time threshold (e.g., transmitting for 2 hours), or some combination thereof. In alternate embodiments, the transmitter 105 may generate a data signal representative of the entire charging data, and then continue to re-transmit the data signal until the stop condition is met.

Figure 3:
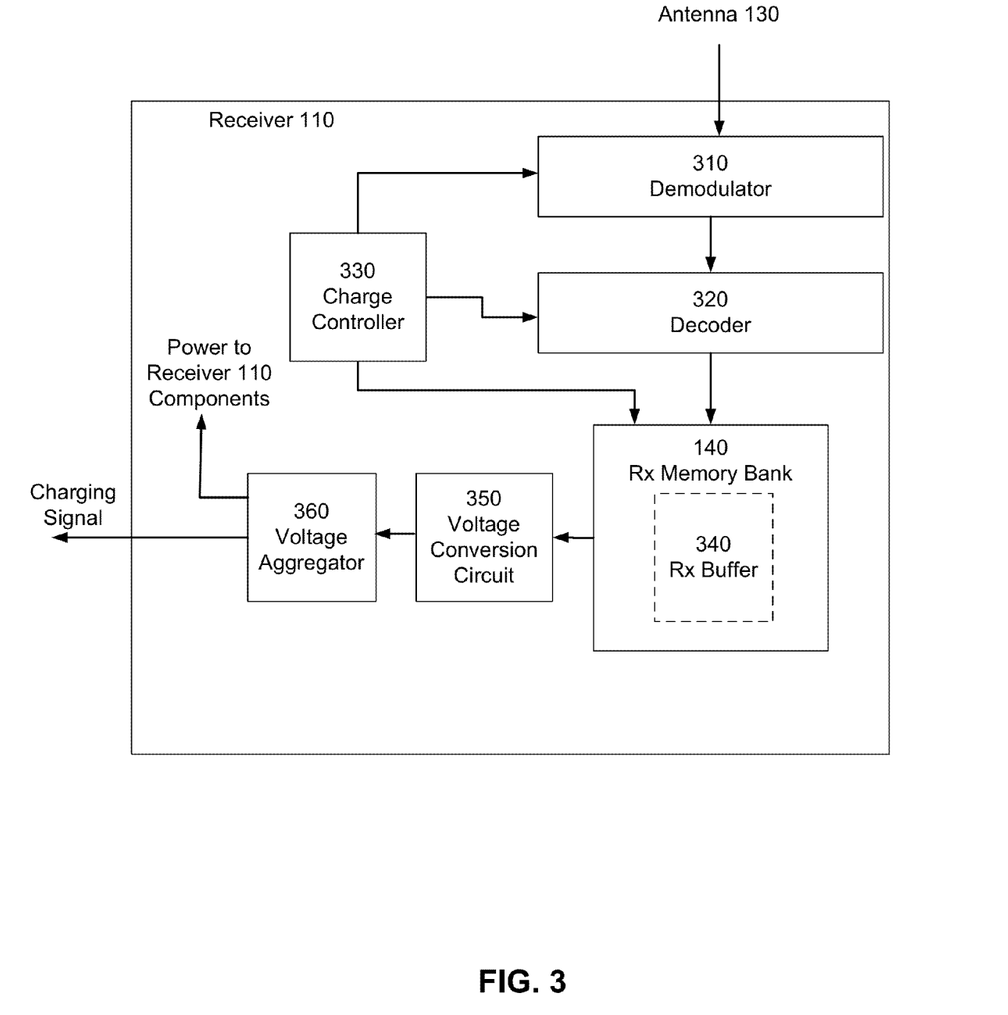
FIG. 3 is a block diagram illustrating a detailed view of the components within a receiver according to an embodiment.

Turning now to a detailed explanation of the receiver 110, FIG. 3 is a block diagram illustrating a detailed view of the components within the receiver 110 according to an embodiment. The receiver 110 includes a demodulator 310, a decoder 320, a charge controller 330, a Rx memory bank 140, a voltage conversion circuit 350, and a voltage aggregator 360.

The demodulator 310 is configured to demodulate the data signal received via the antenna 130 to extract the information signal. The information signal is used by the receiver 110 to generate a charging signal for a device 120. The demodulator 310 is coupled to the antenna 130 and the decoder 320. The demodulator 310 provides the information signal to the decoder 320.

In some embodiments, the decoder 320 is configured to recognize an initialization packet that marks the beginning of the information signal. The decoder 320 is configured to discard the initialization packet and extract the remaining encoded data, non-encoded data, or both. The decoder 320 is coupled to the demodulator 310, the Rx memory bank 140, and the charge controller 330.

The decoder 320 decodes the encoded data to obtain the charging data and associated index. In some embodiments, the decoder 320 extracts a key from the information signal that may be used to decode encoded data (e.g., an encoded index and charging data) in the information signal. In other embodiments, the decoder 320 utilizes an internal key to decode the encoded data. Additionally, the decoder 320 may perform error correction (e.g., FEC) on the charging data and index.

The decoder 320 writes the charging data to the Rx memory bank 140. As discussed above with respect to FIG. 1, the Rx memory bank 140 may include one or more memory storage devices. The decoder 320 writes portions of charging data to each of the memory storage devices. The decoder 320 identifies which memory storage device to write a portion of the charging data using the index, and writes charging data to the identified memory storage device in a sequential manner. For example, the portion of charging data from a first data signal is written to a first set of memory addresses (e.g., physical memory cells, virtual memory cells, or some combination thereof), a subsequent portion of the charging data from a subsequent data signal is written to the next set of memory addresses, and so on until the last set of memory addresses are used, and then the process repeats.

The Rx memory bank 140 stores the charging data in physical and/or virtual memory cells. The physical memory cells in the Rx memory bank 140 may be treated as a number of capacitors that each have a small amount of charge. The Rx memory bank 140 outputs (e.g., in accordance with instructions received from the charge controller 330) portions of the stored charging data via one or more memory busses that couple the Rx memory bank 140 to the voltage conversion circuit 350. Additionally, the Rx memory bank 140 includes an Rx buffer 340.

The Rx buffer 340 acts as a virtual memory for the Rx memory bank 140. The Rx buffer 340 is composed of a plurality of virtual memory cells. The Rx buffer 340 is associated with a memory storage device in the Rx memory bank 140. Additionally, in embodiments where the Rx memory bank 140 includes a plurality of memory storage devices, each memory storage device is associated with its own Rx buffer 340. The structure of the Rx buffer 340 is such that its virtual memory cells map to corresponding virtual memory cells in the Tx buffer 220. In some embodiments, there is a 1 to 1 mapping between the virtual memory cells in the Rx buffer 340 and the Tx buffer 220. In other embodiments, the Rx buffer 340 is a scaled up version of the Tx buffer 220.

The charge controller 330 extracts charging data from the Rx memory bank 140. The charge controller 330 sends read commands to the memory storage devices, causing the memory storage devices to output portions of charging data on their respective memory busses. As discussed below with reference to the voltage aggregator 360, charging data output on a memory bus has a small voltage value associated with it, and is used to generate a partial charging signal. The charge controller 330 sends the read commands to the memory storage devices in a particular order. In some embodiments, the order is the same order that the decoder 320 uses to write portions of charging data to the different memory storage devices.

The charge controller 330 uses the bit values of the virtual memory cells to recharge the bit values associated with their corresponding physical memory cell as charge dissipates (e.g., via charging the device 120) in the physical memory cells. For example, the charge controller 330 may cause a memory storage device to output a portion of charging data stored in a group of physical memory cells via its memory bus. The charge controller 330 then commands the Rx buffer 340 to transfer bit values in virtual memory cells that correspond to the group of physical memory cells—effectively resetting the voltage in the physical memory cell.

A physical memory cell is able to maintain a voltage associated with its bit value so long as a charge rate at which data is written to the physical memory cell is substantially faster than the discharge rate of the physical memory cell. The charge rate is a number of writes per unit time that a bit value is written to a physical memory cell. The discharge rate is the number of discharges per unit time while the receiver 110 is under load (e.g., charging a device 120). For example, a physical memory cell can maintain its bit value if the charge rate is at least 16 times faster than the discharge rate. Note that each data signal received by the receiver 110 includes charging data. Accordingly, the charge rate may be increased by, for example, increasing the bit rate of each data signal, receiving a larger number data signals, increasing how fast the data signals are received, or some combination thereof.

The voltage conversion circuit 330 converts the portions of charging data output by the Rx memory bank 140 into one or more direct current partial charging signals. The voltage conversion circuit 330 may include, for example, one or more filters (i.e., low pass filter), one or more diodes, one or more energy storage devices, or some combination thereof, that are coupled to the memory busses. The filters may be used, for example, to ensure that the charging signal passed to the voltage aggregator 360 is a direct current signal. The diodes may be used to prevent current from being reflected back toward the Rx memory bank 140. In embodiments including multiple memory storage devices that are each coupled to their own memory bus, each memory bus is coupled to its own set of one or more filters, one or more diodes, an energy storage device, or some combination thereof. Each energy storage device is charged using the portions of charging data received on a respective memory bus. An energy storage device stores the charging data as energy and outputs a direct current partial charging signal using the stored energy. An energy storage device may be, for example, a capacitor, an inductor, or some combination thereof. The voltage conversion circuit 350 is coupled to the Rx memory bank 140 and the voltage aggregator 360.

The voltage aggregator 360 aggregates the one or more partial charging signals into a charging signal. The voltage aggregator 360 includes an energy storage device (e.g., a capacitor) that is charged by the partial charging signals and outputs a charging signal that approximately equals the aggregate of partial charging signals. For example, assuming each partial charging signal is 1.5 V, and there are four partial charging signals, the voltage aggregator 360 aggregates the partial charging signals to create a charging signal of 6 Volts. The voltage aggregator 360 uses the charging signal to charge the device 120.

The charging signal may be provided to the device 120 in a number of ways. For example, the charging signal may used to power a wireless charging mechanism (e.g., inductance) that may is used to charge the device, the charging signal may be provided via a cable to the device 190, the charging signal may directly charge an internal battery of the device 120 (e.g., if the receiver 110 is part of the device 120), etc.

Additionally, in some embodiments, portions of the charging signal may be used to power other components of the receiver 110. During start up the receiver 110 may draw power from the device 120 until a charging signal is produced. After which the receiver 110 is powered by a portion of the charging signal and another portion of the charging signal is used to charge the device 120. In alternate embodiments, the receiver 110 may also include an internal battery that is used to power the receiver 110 during start up, after which the components of the receiver 110 may be powered using portions of the charging signal.

Figure 4:
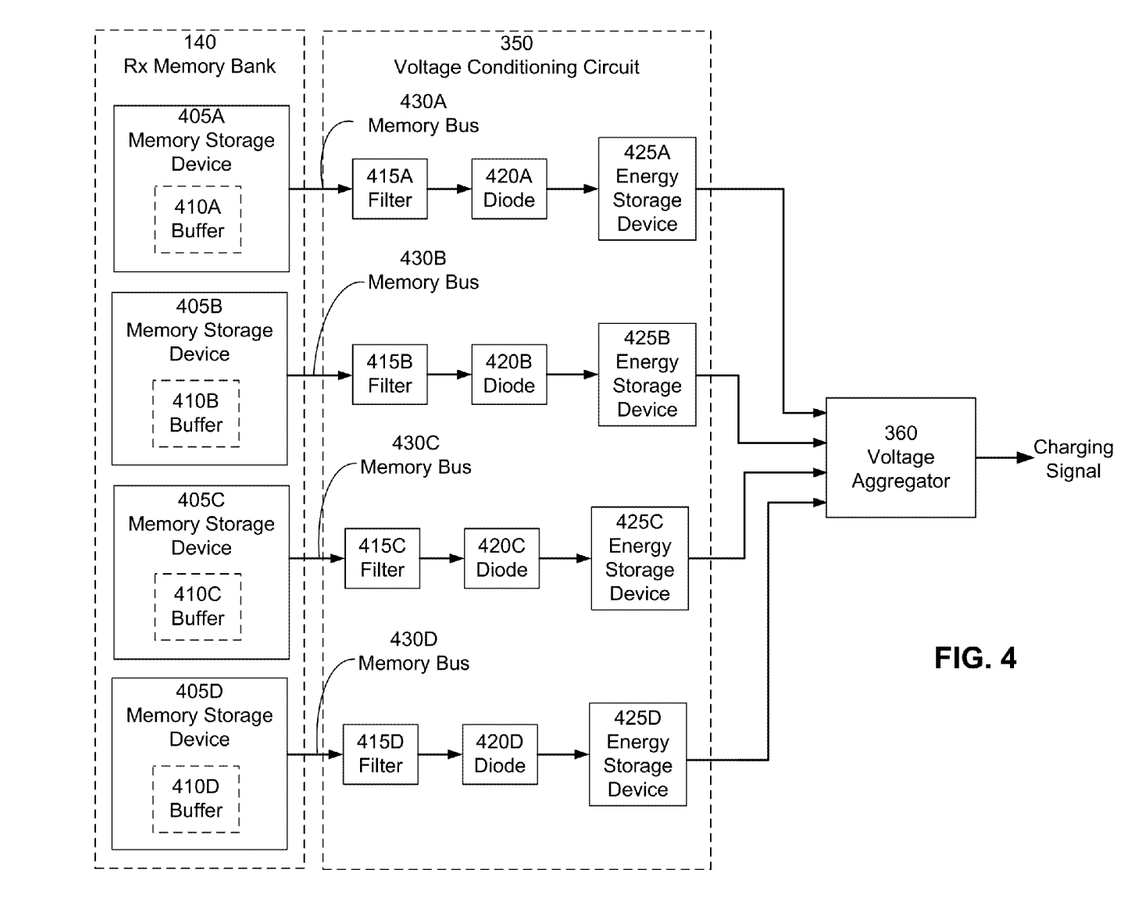
FIG. 4 is a high-level block diagram illustrating a portion of an example receiver according to an embodiment.

FIG. 4 is a high-level block diagram illustrating a portion of an example receiver 110 according to an embodiment. The portion of the receiver 110 includes the Rx memory bank 140, the voltage conversion circuit 350, and the voltage aggregator 360.

The Rx memory bank 140 includes multiple memory storage devices 405 A-D, and buffers 410A-D. The voltage conversion circuit 350 includes filters 415A-D, diodes 420A-D, and energy storage devices 425A-D. The filters, diodes, and energy storage devices are coupled to the memory storage devices via memory busses 430A-D. The energy storage devices 425A-D are coupled to the voltage aggregator 360.

In some embodiments, each memory storage device 405A-D outputs a portion of charging data in a particular order. For example, the memory storage devices 405A-D may output the charging data in a cyclic fashion. For example, the memory storage device 405A outputs some portion of its stored charging data, then the memory storage device 405B outputs some portion of its stored charging data, then the memory storage device 405C outputs some portion of its stored charging data, the memory storage device 405D outputs some portion of its stored charging data, and then the cycle repeats. Accordingly, at a given time, only a single energy storage device 425A, B, C, or D is being charged with a portion of charging data. In alternate embodiments, the charging data may be output from the memory storage devices in a different order and/or in parallel, thus affecting how the energy storage devices are charged.

The energy storage devices 425A-D each output a direct current partial charging signal as they discharge energy. The charge rate (i.e., rate of receipt of portions of charging data) of an energy storage device is greater than the rate of discharge (i.e., partial charging signal), accordingly, each of the energy storage devices 425A-D act as an energy source. For example, assuming the memory storage device 405A is a 30 PIN-144 SO-DIMM, the energy storage device 425A may output a partial charging signal of 1.5 V at 100 mA under a 6 Ohm load.

The energy storage devices 425A-D are chosen such that the partial charging signals output from the energy storage devices 425A-D, when aggregated by the voltage aggregator 360, produce a stable charging signal. For example, assuming the memory storage devices 405A-D are identical, the energy storage devices 425A-D may simply be capacitors with the same capacitance values. In contrast, if different types of memory storage devices are used and/or memory storage devices with different storage capacities, the capacitances of the energy storage devices 425A, B, C, and/or D may differ to ensure a stable charging signal is produced by the voltage aggregator 360.

As the memory storage devices 405A-D outputs the charging data, the receiver 110 is also writing charging data received from the transmitter 105 to the memory storage devices 405A-D. For example, as memory storage device 405A is outputting a portion of charging data, the receiver 110 may be writing some portion of charging data to memory storage device 405B, and when memory storage 405B is outputting a portion of charging data, the receiver 110 may be writing some portion of charging data to memory storage device 405C, and so on.

As the portions of the charging data are output to their respective memory bus, the voltage levels associated with the physical memory cells in the memory storage devices drops. The buffers 410A-D update the physical memory cells in the memory storage devices 405A-D with the bit values in the corresponding virtual memory cells to maintain the bit value (e.g., voltage level) of the physical memory cells. New charging data may be written (e.g., by the decoder 320) to the memory storage devices 405A-D and the buffers 410A-D, thereby recharging the memory cell pairs.

The memory busses 430A-D provide the portions of charging data to a respective filter, diode, and energy storage device. The filters 415A-D, diodes 420A-D, and energy storage devices 425A-D, perform as described above with reference to FIG. 3 within the voltage conversion circuit 350. Each of the energy storage devices outputs a partial charging signal to the voltage aggregator 360.

The voltage aggregator 360 generates the charging signal by aggregating the partial charging signals into a single direct current charging signal. Continuing with the example above, the voltage aggregator 360 would aggregate the four 1.5 V signals to generate a charging signal of 6 V under a 6 Ohm load.

Figure 5:
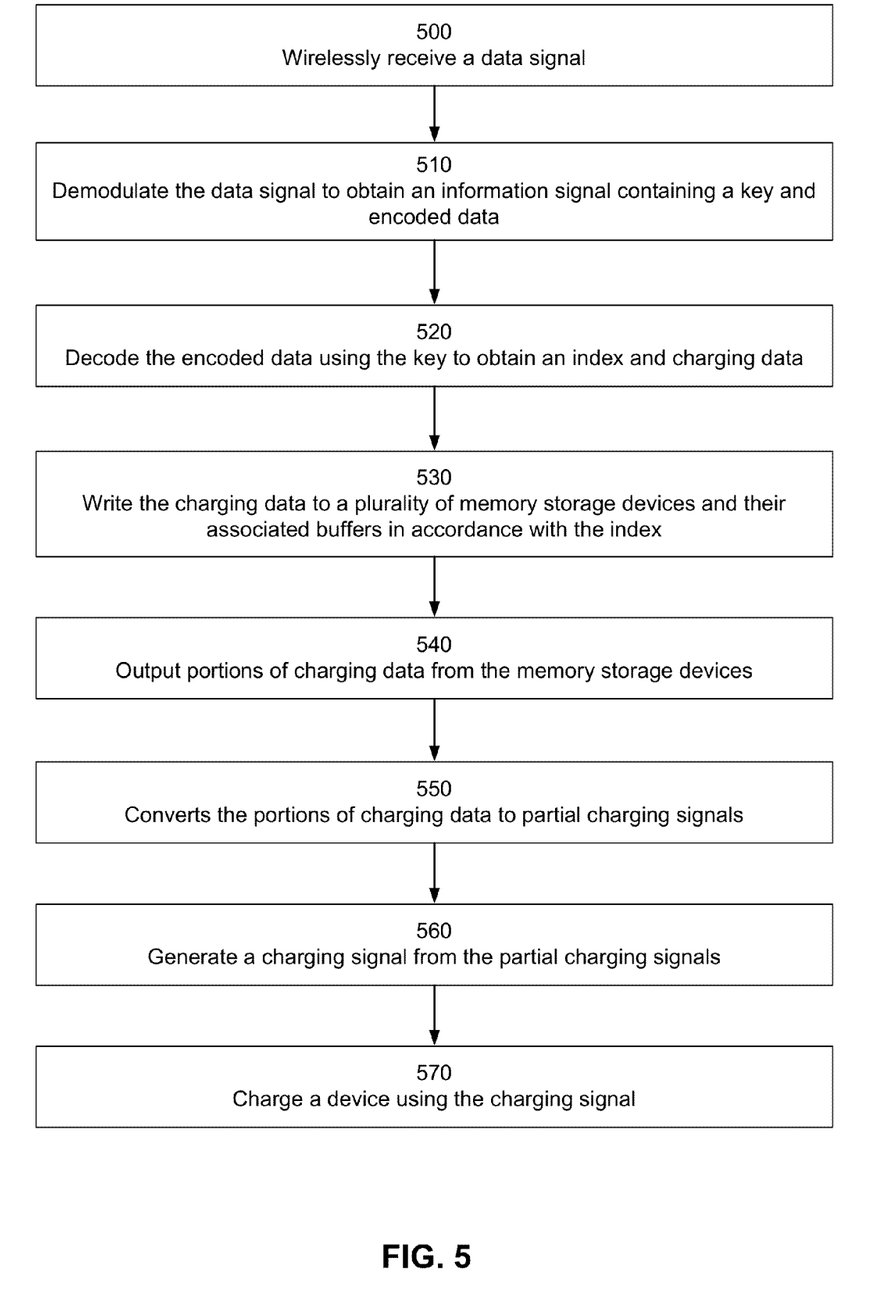
FIG. 5 is a flowchart illustrating a process for generating a charging signal based on a wireless data signal according to an embodiment.

FIG. 5 is a flowchart illustrating a process for generating a charging signal based on a wireless data signal according to an embodiment. In one embodiment, the process of FIG. 5 is performed by the receiver 110. Other entities may perform some or all of the steps of the process in other embodiments. Likewise, embodiments may include different and/or additional steps, or perform the steps in different orders.

The receiver 110 wirelessly receives 500 a data signal. The receiver 110 demodulates 510 the data signal to obtain an information signal containing a key and encoded data. The receiver 110 decodes 520 the encoded data using the key to obtain an index and charging data. Additionally, in some embodiments, the receiver 110 also performs error correction, such as FEC, on the charging data and index.

The receiver 110 writes 530 charging data to a plurality of memory storage devices and/or their associated buffers in accordance with the index. For example, the receiver 110 identifies which portions of the charging data are to be written to which memory storage device (and associated buffer)

using the index. The receiver 110 then writes the portions of the charging data to the appropriate memory storage device and buffer.

The receiver 110 causes the memory storage devices to output 540 portions of the charging data on their respective memory busses (e.g., via read commands). For example, the commands may cause the memory storage devices to cyclically output portions of stored charging data on their respective memory busses.

The receiver 110 converts 550 the portions of charging data to partial charging signals. The receiver 110 stores the portions of the charging data in energy storage devices (e.g., capacitors) that output partial charging signals. Additionally, in some embodiments, the receiver 110 may filter the portions of charging data and/or provide circuit protection for the Rx memory bank 140 (e.g., using diodes to prevent current flow toward the memory storage devices) before providing the charging data to the energy storage devices.

The receiver 110 generates 560 a charging signal from the one or more partial charging signals. For example, the receiver 110 can aggregate the partial charging signals into a single charging signal. The receiver 110 then charges 570 a device 120 using the charging signal.

While not illustrated in FIG. 5, in some embodiments, after step 570 the process flow moves back to step 540, and a different portion of the stored charging data is output. Moreover, a plurality of data signals may be sequentially received such that the charging data is being written to the memory storage devices at a rate faster than it is being outputted from the memory storage devices.

ALTERNATE EMBODIMENTS

In some embodiments, a single transmitter 105 may transmit data signals to multiple receivers 110. Each receiver 110 may have their own unique key, and the controller 210 would maintain copies of each of these keys. The encoder 230 encodes information signals for a particular receiver 110 using a key that corresponds to that receiver 110 (i.e., the receiver 110 has a key that enables it to decode the information signal). By encoding the charging data and index such that they are keyed to a particular receiver 110, the transmitter 105 is able to interact with multiple receivers 110 using the same carrier frequency, and have minimal interference between the information signals. Additionally, the controller 210 may use one or more control parameters to generate data signals that are recognized only by an intended receiver 110. For example, the control parameters may specify a particular combination of, e.g., charging data, key, carrier frequency, modulation scheme, or some combination thereof, that is different for each of the multiple receivers 110.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for wireless power transfer using a data signal. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:

1. A receiver for wireless power transfer via a data signal, comprising:
a receiver memory bank including a plurality of memory storage devices coupled to a plurality of memory buses;
a decoder configured to:
decode a wireless data signal received by the receiver to extract charging data therefrom, and
write the charging data to the plurality of memory storage devices;
a charge controller configured to cause the plurality of memory storage devices to output portions of the charging data on the plurality of memory busses;
a voltage conversion circuit coupled to the plurality of memory busses configured to produce partial charging signals from the portions of charging data received on the plurality of memory busses; and a voltage aggregator configured to aggregate the partial charging signals to generate a charging signal.

2. The receiver of claim 1, wherein the charge controller is further configured to cause the plurality of memory storage devices to cyclically output portions of charging data in a manner that cycles from one memory storage device to another, such that only a subset of the memory storage devices is outputting a portion of charging data within a given time.

3. The receiver of claim 1, wherein the decoder is further configured to write portions of charging data to the plurality of memory storage devices in a cyclic manner, such that the decoder is writing a portion of charging data to only a subset of the memory storage devices within a given time.

4. The receiver of claim 1, further comprising:
a demodulator configured to demodulate the data signal to obtain an information signal including a key and encoded data;
wherein the decoder is further configured to decode the encoded data in the information signal using the key to obtain an index and the charging data.

5. The receiver of claim 4, wherein the decoder is further configured to:
identify which portions of charging data are to be written to which memory storage device, of the plurality of memory storage devices, using the index.

6. The receiver of claim 1, wherein the decoder is further configured to:
a demodulator configured to demodulate the data signal to obtain an information signal,
wherein the decoder is further configured to:
retrieve a stored key from a local memory, and
decode the encoded data in the information signal using the key to obtain an index and the charging data.

7. The receiver of claim 1, wherein a memory storage device includes a plurality of physical memory cells and a virtual memory, the virtual memory including a plurality of virtual memory cells corresponding to the plurality of physical memory cells, and the charge controller is further configured to cause the memory storage device to write a value of a virtual memory cell to its corresponding physical memory cell after the memory storage device outputs a portion of charging data that includes the value of the corresponding physical memory cell.

8. A transmitter for wireless power transfer via a data signal, comprising:
a transmitter memory bank that includes a plurality of memory storage devices that store charging data and are scaled relative to a plurality of memory storage devices in a corresponding receiver;
an encoder configured to generate an information signal using portions of the charging data in the transmitter memory bank;
a signal generator configured to generate a carrier signal;
a modulator configured to modulate the carrier signal with the information signal to generate the data signal; and
an antenna coupled to the modulator that wirelessly transmits the data signal to the corresponding receiver, the receiver adapted to store charging data derived from the data signal in the plurality of memory storage devices in the receiver.

9. The transmitter of claim 8, wherein the encoder is further configured to upsample the charging data, the amount of upsampling based on the scaling of the plurality of memory storage devices in the transmitter relative to the plurality of memory storage devices in the receiver.

10. The transmitter of claim 8, wherein each of the plurality of memory storage devices in the transmitter include a corresponding buffer that stores portions of charging data.

11. The transmitter of claim 8, wherein the information signal comprises an index and portions of the charging data, and the encoder is further configured to:
retrieve from one or more of the memory storage devices in the transmitter a portion of the charging data;
map the portions of the retrieved charging data to index values that identify corresponding memory storage devices in the receiver;
generate an index using the index values, the index and the portions of the charging data forming the information signal; and
encode the index and charging data using a key.

12. The transmitter of claim 11, wherein the encoder is further configured to append the key to the information signal.

13. The transmitter of claim 8, further comprising:
a controller configured to:
select a key specific to the receiver;
provide the key to the encoder; and
the encoder is further configured to:
retrieve from one or more of the memory storage devices in the transmitter a portion of the charging data,
map the portions of the retrieved charging data to index values that identify corresponding memory storage devices in the receiver,
generate an index using the index values, the index and the portions of the charging data forming the information signal, and
encode the index and charging data using the key.

14. The transmitter of claim 8, further comprising:
a controller configured to:
determine the charging data using a lookup table that maps different charging data to different receivers; and
write the charging data to the plurality of memory storage devices in the transmitter.

15. A system for wireless power transfer via a data signal, comprising:
a transmitter configured to generate and transmit a wireless data signal that includes charging data; and
a receiver configured to receive the wireless data signal, the receiver comprising:
a receiver memory bank including a plurality of memory storage devices coupled to a plurality of memory buses;
a decoder configured to:
decode the wireless data signal received by the receiver to extract charging data therefrom, and
write the charging data to the plurality of memory storage devices;
a charge controller configured to cause the plurality of memory storage devices to output portions of the charging data on the plurality of memory busses,
a voltage conversion circuit coupled to the plurality of memory busses configured to produce partial charging signals from the portions of charging data received on the plurality of memory busses, and
a voltage aggregator configured to aggregate the partial charging signals to generate a charging signal.

16. The system of claim 15, wherein the transmitter comprises:

a transmitter memory bank that includes a plurality of memory storage devices that store charging data and are scaled relative to a plurality of memory storage devices in the receiver;

an encoder configured to generate an information signal using portions of the charging data in the transmitter memory bank;

a signal generator configured to generate a carrier signal;

a modulator configured to modulate the carrier signal with the information signal to generate the data signal; and an antenna coupled to the modulator that wirelessly transmits the data signal to the receiver.

17. The system of claim 15, wherein the charge controller is further configured to cause the plurality of memory storage devices to cyclically output portions of charging data in a manner that cycles from one memory storage device to another, such that only a subset of the memory storage devices is outputting a portion of charging data within a given time.

18. The system of claim 15, wherein the decoder is further configured to write portions of charging data to the plurality of memory storage devices in a cyclic manner, such that the decoder is writing a portion of charging data to only a subset of the memory storage devices within a given time.

19. The system of claim 15, wherein the receiver further comprises:

a demodulator configured to demodulate the wireless data signal to obtain an information signal including a key and encoded data;

wherein the decoder is further configured to decode the encoded data in the information signal using the key to obtain an index and the charging data.

20. The system of claim 15, wherein a memory storage device includes a plurality of physical memory cells and a virtual memory, the virtual memory including a plurality of virtual memory cells corresponding to the plurality of physical memory cells, and the charge controller is further configured to cause the memory storage device to write a value of a virtual memory cell to its corresponding physical memory cell after the memory storage device outputs a portion of charging data that includes the value of the corresponding physical memory cell.

* * * * *